United States Patent
Dziwok et al.

(10) Patent No.: US 9,637,614 B1
(45) Date of Patent: *May 2, 2017

(54) PROCESS OF MANUFACTURING THICKENERS AND THE USE OF THUS PRODUCED THICKENERS IN HIGH-VISCOSITY UNSATURATED POLYESTER CONTAINING FORMULATIONS

(71) Applicants: BYK-Chemie, GmbH, Wesel (DE); BYK USA, Inc., Gonzales, TX (US)

(72) Inventors: Klaus Dziwok, Freilassing (DE); Helmut Coutelle, Freising (DE); Robert G. Briell, Seguin, TX (US); Tyler Nash, Dale, TX (US)

(73) Assignee: BYK USA Inc., Wesel (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/355,514

(22) Filed: Nov. 18, 2016

(30) Foreign Application Priority Data

Jun. 22, 2016 (EP) ..................................... 16175825

(51) Int. Cl.
*C08K 9/04* (2006.01)
*C08K 5/19* (2006.01)
(Continued)

(52) U.S. Cl.
CPC ................. *C08K 9/04* (2013.01); *C08J 3/203* (2013.01); *C08K 3/346* (2013.01); *C08K 5/19* (2013.01); *C08J 2367/06* (2013.01)

(58) Field of Classification Search
CPC . C09K 9/04; C08J 3/203; C08K 3/346; C08K 5/19
See application file for complete search history.

(56) References Cited

U.S. PATENT DOCUMENTS 3,252,757 A   5/1966   Granquist
3,348,778 A   10/1967  Cohn, et al.
(Continued)

FOREIGN PATENT DOCUMENTS

EP   0 220 346 A1   5/1987
EP   0 835 910 A1   4/1998
(Continued)

OTHER PUBLICATIONS

Crosa, Mario, et al., "Determination of Mean Crystallite Dimensions From X-Ray Diffraction Peak Profiles; A Comparative Analysis of Synthetic Hematites", Clays and Clay Minerals, Dec. 1, 1999, pp. 742-747, vol. 47, No. 6, The Clay Minerals Society.
(Continued)

*Primary Examiner* — John Uselding
(74) *Attorney, Agent, or Firm* — Curatolo Sidoti Co., LPA; Joseph G. Curatalo; Vincent A. Cortese (57) ABSTRACT

The invention relates to the use of at least one mixed mineral organoclay rheology additive, which comprises or consists of a quaternary alkyl-ammonium salt treated mineral clay mixture prepared by forming an aqueous hormite clay slurry (a), forming an aqueous smectite clay slurry (b), combining the aqueous hormite clay slurry (a) with the aqueous smectite clay slurry (b) to form a combined clay slurry (c), treating the combined clay slurry (c) with one or more quaternary alkyl-ammonium salts, and separating the thus produced quaternary alkyl-ammonium salt treated mineral clay mixture from the aqueous medium. The invention also relates to a process for producing a mixed mineral organoclay rheology additive and the use of the thus produced additive as a thickening agent in liquid compositions.

20 Claims, 1 Drawing Sheet

(51) Int. Cl.
*C08K 3/34* (2006.01)
*C08J 3/20* (2006.01)

(56) References Cited

U.S. PATENT DOCUMENTS

| | | |
|---|---|---|
| 3,586,468 A | 6/1971 | Sims et al. |
| 3,666,407 A | 5/1972 | Orlemann |
| 3,671,190 A | 6/1972 | Neumann |
| 3,844,978 A | 10/1974 | Hickson |
| 3,844,979 A | 10/1974 | Hickson |
| 3,852,405 A | 12/1974 | Granquist |
| 3,855,147 A | 12/1974 | Granquist |
| 4,842,073 A | 6/1989 | Himes et al. |
| 5,837,654 A | 11/1998 | Carroll et al. |
| 6,036,765 A | 3/2000 | Farrow et al. |
| 6,328,106 B1 | 12/2001 | Griffith et al. |
| 6,534,570 B2 | 3/2003 | Farrow et al. |
| 6,635,108 B1 | 10/2003 | Farrow et al. |
| 6,800,157 B2 | 10/2004 | Tarbutton et al. |
| 8,389,447 B2 | 3/2013 | Dino et al. |
| 2002/0002230 A1 | 1/2002 | Farrow et al. |
| 2007/0197403 A1 | 8/2007 | Dino et al. |
| 2010/0310878 A1 | 12/2010 | Hofstetter et al. |

FOREIGN PATENT DOCUMENTS

| | | |
|---|---|---|
| EP | 1141071 A2 | 10/2001 |
| EP | 2 085 426 A1 | 8/2009 |
| WO | WO 97/17398 | 5/1997 |
| WO | WO 97/17398 A1 | 5/1997 |
| WO | WO 2015/138407 A1 | 9/2015 |

OTHER PUBLICATIONS

Rytwo, Giora, et al., "Adsorption of Monovalent Organic Cations on Sepiolite: Experiemental Results and Model Calculations", Clays and Clay Minerals, 1998, pp. 340-348, vol. 46, No. 3, The Clay Minerals Society.

Shariatmadari, H., et al., "Sorption of Selected Cationic and Neutral Organic Molecules on Palygorskite and Sepiolite", Clays and Clay Minerals, 1999, pp. 44-53, vol. 47, No. 1, The Clay Minerals Society.

European Extended Search Report mailed on Dec. 12, 2016 for corresponding European Patent Application No. 16175825.

Chemeda, et al., "Rheological Properties of Palygorskite-Bentonite and Sepiolite-Bentonite Mixed Clay Suspensions", Applied Clay Science, Feb. 18, 2014, pp. 165-174, vol. 90, Elsevier B.V.

PROCESS OF MANUFACTURING THICKENERS AND THE USE OF THUS PRODUCED THICKENERS IN HIGH-VISCOSITY UNSATURATED POLYESTER CONTAINING FORMULATIONS

The present invention relates to a process of manufacturing specialized thickeners and the use of thus produced thickeners in high-viscosity unsaturated polyester containing formulations. The invention particularly relates to the use of the thus produced thickeners in modifying the rheology of non-aqueous formulations like unsaturated polyester containing formulations.

TECHNOLOGICAL BACKGROUND

In particular in the field of adhesives, sealants, coating agents and molding compounds as well as non-aqueous based oil-drilling fluids and the like, it is necessary to customize the rheological properties of such systems, primarily through adjusting the consistency by the selection of binding agents, solvents and the concentration of pigments and/or fillers. However, in many cases an adjustment to the desired consistency with the help of the aforementioned components is not sufficient. In such cases, the addition of so-called rheology additives (i. e. rheological additives) is required. The effect of this can be lowering the viscosity for the purpose of better processability or an increase in viscosity, which in the present invention is referred to as "thickening."

Many different organic or inorganic thickeners are described for the purposes cited.

Commonly used in aqueous systems are cellulose ether, starch, natural hydrocolloids, synthetic biopolymers, polyacrylate thickeners, associative thickening agents based on hydrophobically-modified polymers such as polyethers, ether urethanes, polyacrylamides and alkaline activated acrylate emulsions or water swellable inorganic thickeners.

Typical rheology additives for non-aqueous systems include, in addition to organic thickeners such as waxes and thixotropic resins, inorganic thickeners such as, for example, magnesium oxide and magnesium hydroxide or amorphous silica and layered silicates.

Among layered silicates, clay materials are often used as thickeners; among these, organically modified clay materials (also known as organoclays) are used in the art.

Organoclays are widely used as thickeners, more specifically thixotropes, for organic solvents or organic coatings systems like paints and varnishes and in composites as well. They are typically used in an additive amount, i.e. an amount of 10% by weight or less to improve the application properties of liquid organic systems. Such thickened organoclay containing liquid organic systems show thixotropic or pseudoplastic behavior. This improves the storage stability of organic systems. It prevents the demixing and especially the sedimentation of pigments and fillers in the system during storage. It keeps the organic systems homogeneous.

A further purpose for which the organoclays are used is to increase the sag resistance of liquid organic systems. Typically paints which are applied to vertical surfaces tend to run down and cause drop formation on the substrate. The paints can only be applied in a certain limited film thickness before they start running down or start dropping. This is usually called "sagging". Organoclays can reduce sagging by increasing the viscosity of the system. The increase in viscosity can be regarded as a gelling of the systems within a time frame of seconds to minutes.

The way the organoclays are doing this is mostly referred to as a house of cards structure. The organoclay is made out of clay minerals in form of platelets or in form of needle-like pseudo laminar structures. The clay platelets at rest are supposed to orientate themselves in a shape similar to a house of cards. This house of cards has a certain stability which provides the gelling and anti-sagging properties. But when moved during application by painting, spraying and the like, this house of cards breaks down and only low apparent viscosity is visible during application. After application, when there is no strong external force on the liquid, this house of cards recovers within seconds to minutes and gives viscosity in form of gelling at low shear forces. This can be measured by means of a rheometer especially when the viscosity is monitored at low shear forces, i. e. low speed of the rotating part of the rheometer. That means organoclays do not increase the apparent viscosity of the liquid system too much during application, but gel formation occurs very quickly after the application due to the strong low shear viscosity input.

Organoclays typically are made from inorganic clays. Natural clay is usually only badly compatible with solvents. Typically it is hydrophilic and mainly suspendable in water, less in most organic solvents. Therefore the surface of the clay mineral has to be rendered hydrophobic. This is done by an organic coating of the clay surface. The clay mineral is typically anionically charged. The most common method is to treat the anionic clay with cationic surfactants, namely quaternary ammonium salts. Both educts are typically reacted in water. The quaternary ammonium goes to anionic charges on the clay surface and gives a strong bonding to these charges. The clay surface is rendered hydrophobic at that point and the clay loses water solubility. The thus modified clay is usually suspendable in organic solvents, but less in water.

WO-A-97/17398 and U.S. Pat. No. 6,036,765 disclose mixtures of clays that were surface-treated with quaternary alkyl-ammonium salts and which comprise about 50 to 95% by weight, in relation to the layered clay mixture, of a clay mineral selected from the group consisting of sepiolite and/or palygorskite and contain less than 50% by weight, in relation to the layered clay mixture, of at least one smectite. The smectite or smectites can preferably be selected from the group consisting of hectorite, montmorillonite, bentonite, beidelite, saponite, stevensite and mixtures thereof. None of both publications describes the use of hormite clays having a low methylene blue exchange capacity in the manufacture of the therein produced rheology agents.

U.S. Pat. No. 8,389,447 B2 describes organoclay additives to provide oil well drilling fluids with less temperature dependent rheological properties. The additives disclosed therein are based on a synergistic combination of a hectorite organoclay composition and an attapulgite organoclay composition. Each of both clays was treated with at least two different quaternary ammonium salts one of which has to be an alkoxylated quaternary ammonium salt before the thus treated clays were mixed.

WO 2015/138407 A1 also describes mixtures of preformed organophilic modified attapulgite and/or sepiolite clays with preformed organophilic modified bentonite clay for use in oil-based drilling fluid base compositions. However, in contrast to WO-A-97/17398 and U.S. Pat. No. 6,036,765 the most preferred amount of the modified attapulgite/sepiolite in the mixture with the modified bentonite is very low and in the range of about 10% by weight, only.

The thickeners described in the prior art seem to have an average to good performance in the systems they were used in. However there is still a need to provide an improved process of manufacturing thickeners. Using the thus produced thickeners should lead to very reliable and mostly significantly increased thickening effects particularly in specific application systems such as unsaturated polyester containing formulations which are widely used, e. g. in coatings, sealants, adhesives, moulding compounds, composites and plastic materials.

Unsaturated polyester containing formulations can be regarded as semi-finished products which can be transformed into crosslinked products on the basis of incorporated double bonds which preferably copolymerize with ethylenically unsaturated monomers, such as styrene or vinyl toluene, which can be employed as chemically reactive solvents. In unsaturated polyester containing compositions the viscosity is affected generally by at least two factors. Blending of an unsaturated polyester with an ethylenically unsaturated monomer results in an often undesirable decrease of viscosity of the unsaturated polyester containing formulation. To antagonize such effect it is desirable to have a thickener being able to provide thickening properties to the unblended unsaturated polyester containing formulation in a way that there is less to no significant decrease or even an increase of viscosity when the ethylenically unsaturated monomer is added to the unsaturated polyester containing formulation. In the storage form of unsaturated polyester resin containing liquid compositions, the mixture typically contains the actual unsaturated polyester, ethylenically unsaturated monomers as crosslinking agents as well as stabilizers to increase the storage stability. Typically to start the crosslinking reaction between the unsaturated polyester and the ethylenically unsaturated monomers one or more initiators are added into such liquid compositions only shortly before application. After mixing the initiator with or into the liquid unsaturated polyester containing composition radicals are formed and the crosslinking reaction occurs. This reaction is usually exothermic, resulting in an increase of temperature. The initial increase of temperature is usually associated with a decrease of viscosity of the formulation. However at a later stage, when curing has proceeded, viscosity will start to increase again, due to the formation of larger molecules formed in the reaction between the unsaturated polyester and/or ethylenically unsaturated monomers. Therefore the initial decrease in viscosity after the start of the reaction of the unsaturated polyester with the ethylenically unsaturated monomers demands an extraordinarily high performance of the thickener used. By any means, it needs to be avoided that the initial decrease of viscosity of the ready-to-use formulation leads to undesired sagging and the like. In filled and/or pigmented compositions, such as for example moulding compounds or composites a higher viscosity may further prevent dispersed fillers and/or pigments from sedimentation.

In summary, it was the aim of the inventors of the present invention to provide an improved process of manufacturing thickeners and the use of the thus produced thickeners in liquid unsaturated polyester containing formulations showing an increased viscosity for a given amount of rheology additive. It was a further aim of the inventors to provide a very reliable process for producing an organoclay based rheology additive with a higher performance compared to structurally related organoclay additives known from the state of the art.

SUMMARY

The before mentioned goals were achieved by providing a process of manufacturing a mixed mineral organoclay rheology additive, which comprises or consists of a quaternary alkyl-ammonium salt treated mineral clay mixture, the process being characterized by
  i. forming an aqueous hormite clay slurry (a)
  ii. forming an aqueous smectite clay slurry (b)
  iii. combining the aqueous hormite clay slurry (a) with the aqueous smectite clay slurry (b) to form a combined clay slurry (c)
  iv. treating the combined clay slurry (c) with one or more quaternary alkyl-ammonium salts and
  v. optionally separating the thus produced quaternary alkyl-ammonium salt treated mineral clay mixture from the aqueous medium,
in which
  the aqueous hormite clay slurry (a) being formed by
    (i.1) dispersing a fraction of one or more hormite clays selected from the group of sepiolites and palygorskites in an aqueous medium to form a dispersion,
  and
  the aqueous smectite clay slurry (b) being formed by
    (ii.1) dispersing a fraction of one or more smectite clays in an aqueous medium to form a dispersion,
  and
  in that the weight of the hormite clay content exceeds the weight of the smectite clay content in the combined clay slurry (c); and
  subjecting the dispersions formed in (i.1) and (ii.1) to high speed fluid shear before carrying out step iii. and/or after having carried out step iii; and
  wherein the one or more hormite clays employed in the formation of the aqueous hormite clay slurry (a) exhibit a methylene blue exchange capacity below 20 mmol methylene blue per 100 g of the one or more hormite clays in dry state, the methylene blue exchange capacity being determined on the part of an aqueous hormite clay slurry that passes a 100 mesh U.S. standard screen, and the hormite clay slurry before passing the 100 mesh U.S. standard screen having a particle size distribution such that at least 90% by weight, more preferably 95% by weight of the hormite clay contained in the aqueous hormite clay slurry passes the 100 mesh U.S. standard screen.

The above process of manufacturing a mixed mineral organoclay rheology additive, which comprises or consists of a quaternary alkyl-ammonium salt treated mineral clay mixture is herein also called "process according to the invention".

A further object of the present invention is the use of at least one of the mixed mineral organoclay additives obtained by the process according to the present invention as thickener in liquid compositions, preferably non-aqueous liquid compositions.

The mixed mineral organoclay rheology additives as produced according to the present invention are particularly suitable for thickening liquid compositions comprising at least one unsaturated polyester. It was also confirmed that the thus produced additives are not only apt to provide a superior viscosity to unsaturated polyester based formulations, but also to other preferably non-aqueous systems like organic solvents, including unsaturated organic solvents like for example styrene, unsaturated polyester free liquid organic compositions as e. g. non-unsaturated polyester based coating materials, adhesives and sealants as well as organophilic oil and/or gas drilling fluids or thermoplastic moulding compounds and reinforced thermoplastic composites and the like. Therefore, beside their superior properties in thickening liquid unsaturated polyester containing compositions the additives as produced according to the present invention provide an excellent thickening effect to other liquid organic formulations, too. The use as thickener or more specifically as thixotroping agent in such liquid formulations is also object of the present invention.

DETAILED DESCRIPTION

Manufacture of the Mixed Mineral Organoclay Rheology Additives According to the Process of the Invention One primary object of the present invention is to provide a process of manufacturing the mixed mineral organoclay additive of the present invention, which comprises or consists of a quaternary alkyl-ammonium salt treated mineral clay mixture, the process being characterized by:
  i. forming an aqueous hormite clay slurry (a)
  ii. forming an aqueous smectite clay slurry (b)
  iii. combining the aqueous hormite clay slurry (a) with the aqueous smectite clay slurry (b) to form a combined clay slurry (c)
  iv. treating the combined clay slurry (c) with one or more quaternary alkyl-ammonium salts and
  v. optionally separating the thus produced quaternary alkyl-ammonium salt treated mineral clay mixture from the aqueous medium,
in which
the aqueous hormite clay slurry (a) being formed by
  (i.1) dispersing a fraction of one or more hormite clays selected from the group of sepiolites and palygorskites in an aqueous medium to form a dispersion,
and
the aqueous smectite clay slurry (b) being formed by
  (ii.1) dispersing a fraction of one or more smectite clays in an aqueous medium to form a dispersion,
and
in that the weight of the hormite clay content exceeds the weight of the smectite clay content in the combined clay slurry (c); and
subjecting the dispersions formed in (i.1) and (ii.1) to high speed fluid shear before carrying out step iii. and/or after having carried out step iii; and
wherein the one or more hormite clays employed in the formation of the aqueous hormite clay slurry (a) exhibit a methylene blue exchange capacity below 20 mmol methylene blue per 100 g of the one or more hormite clays in dry state, the methylene blue exchange capacity being determined on the part of an aqueous hormite clay slurry that passes a 100 mesh U.S. standard screen, and the hormite clay slurry before passing the 100 mesh U.S. standard screen having a particle size distribution such that at least 90% by weight, more preferably 95% by weight of the hormite clay contained in the aqueous hormite clay slurry passes the 100 mesh U.S. standard screen.

In a first embodiment of the above general process of manufacturing the mixed mineral organoclay additive of the present invention, which comprises or consists of a quaternary alkyl-ammonium salt treated mineral clay mixture, the following steps are carried out:
  i. forming an aqueous hormite clay slurry (a)
  ii. forming an aqueous smectite clay slurry (b)
  iii. combining the aqueous hormite clay slurry with the aqueous smectite clay slurry to form a combined clay slurry (c)
  iv. treating the combined clay slurry (c) with one or more quaternary alkyl-ammonium salts v. optionally separating the thus produced quaternary alkyl-ammonium salt treated mineral clay mixture from the aqueous medium,
in which
the aqueous hormite clay slurry (a) being formed by
  (i.1) dispersing a fraction of one or more hormite clays selected from the group of sepiolites and palygorskites in an aqueous medium, preferably water to form a dispersion,
  (i.2) optionally screening the dispersion formed in (i.1) through a 100 mesh screen to remove coarse particles, and
  (i.3) subjecting the dispersion formed in (i.1) or (i.2) to high speed fluid shear;
the aqueous smectite clay slurry (b) being formed by
  (ii.1) dispersing a fraction of one or more smectite clays in an aqueous medium, preferably water to form a dispersion,
  (ii.2) optionally screening the dispersion formed in (ii.1) through a 100 mesh screen and/or centrifugalizing the dispersion formed in (ii.1) or the dispersion screened through a 100 mesh screen to remove coarse particles, and
  (ii.3) subjecting the dispersion formed in (ii.1) or (ii.2) to high speed fluid shear;
and
in that the weight of the hormite clay content exceeds the weight of the smectite clay content in the combined clay slurry (c);
and
wherein the one or more hormite clays employed in the formation of the aqueous hormite clay slurry (a) exhibit a methylene blue exchange capacity below 20 mmol methylene blue per 100 g of the one or more hormite clays in dry state, the methylene blue exchange capacity being determined on the part of an aqueous hormite clay slurry that passes a 100 mesh U.S. standard screen, and the hormite clay slurry before passing the 100 mesh U.S. standard screen having a particle size distribution such that at least 90% by weight, more preferably 95% by weight of the hormite clay contained in the aqueous hormite clay slurry passes the 100 mesh U.S. standard screen.

In the dispersion steps (i.1) and (ii.1) particle size reduction is achieved. It is particularly preferred to produce particles size distributions such that at least 90 weight-%, more preferred at least 95 weight-% of the particles pass through a 100 mesh screen based on the total weight of the clay in the respective slurry. This can e.g. suitably be achieved by using a dissolver device in dispersion steps (i.1) and (ii.1), e.g. a Cowles dissolver. The term "mesh" as used herein is used in accordance with the US standard mesh system. According to the US standard mesh system a 100 mesh U.S. standard screen has 149 μm mesh openings.

The use of a 100 mesh screen in the optional screening steps (i.2) and (ii.2) is to be understood as the use of an "at least 100 mesh screen". It is of course possible to even use mesh screens with smaller mesh openings than 149 μm. However, a 100 mesh screen is sufficient to prevent damage of devices used for further particle size reduction. Since the particles left on the screen are usually discarded, the use of finer screens than 100 mesh screens may however lead to an unnecessary loss of yield.

The dispersing steps (i.1) and (ii.1) can preferably be carried out as follows. First, a coarse grind of the respective raw clay fraction is prepared, which can be achieved by any conventional crushing, pulverizing or grinding means. The particles of the coarse grind, preferably, but not necessarily, have particle sizes less than 5 mm, more preferably less than 4 mm, as e.g. 2 to 3 mm, which can, if desired, be ensured by sieving the particles through an appropriate mesh screen. Subsequently, the coarsely grinded clay material is preferably added to an aqueous medium, preferably being water, the aqueous medium having a preferred temperature of about 45 to about 70° C., even more preferred of about 50 to about 65° C. and most preferred of about 55 to about 60° C. to form a clay suspension, i.e. a clay slurry. The water content of such slurry being typically in the range of 75 to 98 weight-%, more preferred 85 to 95 weight-% based on the total weight of the slurry. The resulting suspension is preferably agitated under high shear by any conventional dissolver as e.g. a dissolver with a Cowles blade (i.e. a Cowles dissolver). The high shear agitation time period is usually not less than about 30 min and ranges preferably from 0.5 to 2 h. The resulting suspension contains fine clay particles and may be further diluted with water, preferably warm water in the above mentioned temperature range, before optionally being screened through a 100 mesh screen. Such further diluted slurry having a water content typically being in the range of 90 to 99 weight-%, more preferred 92 to 97 weight-% based on the total weight of the slurry.

Although the particle size of the hormite and smectite clays in the hormite clay fraction and smectite clay fraction, respectively, is not particularly critical at this stage, it is preferred to remove coarse particles which do not pass a 100 mesh screen—i.e. to carry out steps (i.2) and (ii.2)—before subjecting the clay to any further homogenization, grinding and/or milling steps and the mandatory treatment with the quaternary alkyl-ammonium salts. Carrying out steps (i.2) and (ii.2) leads to dispersions which do not contain coarse particles and which therefore avoid damage of devices used for further particle size reductions such as e.g. mills, like a Manton-Gaulin mill. To facilitate steps (i.2.) and (ii.2) screening, i.e. sieving can be carried out by using a vibrating screen.

In case steps (i.2) and (ii.2) are carried out, the fine clay particles thus produced preferably have particles size distributions such that at least 90 weight-%, more preferred at least 95 weight-% of the total weight of the dissolver treated clay passes through the 100 mesh screen. The grit retained on the screen should preferably not exceed 10 weight-%, more preferred it should not exceed 5 weight-% based on the total weight of the dissolver treated clay. The grit is discarded and only the finely grained 100 mesh screened clay fraction is used for further treatment. In most cases the amount of grit is less than 5 weight-%, mostly even less than 3 weight-% based on the total weight of the dissolver treated clay.

In particular in case of the smectite clay fraction a further optional centrifugalizing step of the clay suspension which passed the 100 mesh screen can be employed as part of step (ii.2) to even further reduce the amount of larger particles in said suspension by separating and discarding the large particles.

The further reduction of size of the clay particles in the clay slurries that optionally passed the 100 mesh screen and/or were subjected to any optional centrifugalization step(s) is performed in a high speed fluid shear process (steps (i.3) and (ii.3)). Such further size reduction is preferably achieved by subjecting the clay slurries to high speed fluid shear as e. g. described in EP 0 220 346 A1.

The high speed fluid shear, to which the hormite and smectite clay slurries which pass the 100 mesh screen are subjected, is preferably effected by passing the pumpable slurries through a dispersion or colloid mill, which devices are often referred to in the art as "homogenizers". "Pumpability" can be ensured by further diluting the dispersions with an aqueous medium, preferably the aqueous medium as used in steps (i.1.) and (ii.1), and most preferably water. Dispersion and colloid mills are well-known in the art, and are succinctly discussed and characterized at pages 842 and 843 of "Chemical Engineers Handbook", edited by R. H. Perry and C. H. Chilton, 5th Edition, 1973, McGraw Hill Book Company (New York). As is pointed out in this standard reference work, this type of device constitutes a special class of mills normally employed for dispersion and colloidal operations. Such mills operate on a principle of high speed fluid shear. Preferred mills for use in the invention are characterized by including or defining a narrow gap across which a pressure differential is maintained and through which in accordance with the invention the pumpable slurries are passed.

Preferably, the high speed fluid shear required in steps (i.3) and (ii.3) is effected by passing the slurries at high velocities through a narrow gap, across which a high pressure differential is maintained. This type of action, e.g., can be effected in the well-known Manton-Gaulin mill, which device is sometimes referred to as the "Gaulin homogenizer" or "MG mill". In the basic operation of such device, a reciprocating, positive displacement piston-type pump is provided with a homogenizing valve assembly which is affixed to the pump discharge. The not yet completely homogenized slurry enters the valve area at high pressure and low velocity. As it passes through a narrow orifice at the valve, (which is a close-clearance area between the valve and valve seat), its velocity is increased to levels approaching sonic speed. This provides high shear forces for reduction, and in the said device, these forces are further implemented as this high velocity stream strikes an impact ring where its direction is changed. Of further interest in this connection, is U.S. Pat. No. 3,348,778, to M. I. Chin et al, which discloses the use of a Manton-Gaulin type arrangement for treating kaolin clays in order to improve the rheology of a clay-water system subsequently formed from same. For present purposes, the patent is of interest in disclosing certain useful arrangements for the said mill, and further details of the construction of same. The patent also discusses the gap provided in the mills of the type disclosed, and properly observes that such gap is only in the order of 25 µm to 125 µm, but under certain conditions may be as large as 2.5 mm.

In those instances where a gap arrangement, as in the Manton-Gaulin mill, is utilized, said pressure differential across the gap is preferably in the range of from 7,000 kPa to 56,000 kPa with 14,000 to 35,000 kPa being more typical. Depending upon the specifics of the equipment, pressures higher than 56,000 kPa can readily be used.

Said slurries will typically include more than 85 weight-% of water, more preferred more than 90 weight-% of water and even more preferred more than 92 weight-% of water such as 92 to 97 or 98 weight-% of water based on the total weight of the slurry. However, the solids content can vary, and be above the indicated level, if appropriate dispersing agents are present. However the use of dispersing agents is usually not preferred. The principal requirement is that the slurry is pumpable, so that it is capable of being subjected to the aforementioned high speed fluid shear.

In addition to the passage through a narrow gap, as in the aforementioned type Manton-Gaulin mill, the high speed fluid shear can also be effected, pursuant to the invention, by use of dispersion and colloid mills based upon a stator and a closely spaced rotor, wherein a high speed rotation is maintained between the two said elements. The slurry in this instance is subjected to the high speed fluid shear by being passed through the gap between the stator and the rotor. The well-known Greer mill is one example of this type of construction, and may be utilized as one instrumentality in practice of the invention. In the said Greer mill a narrow gap is defined by a stationary stator and a rotor which rotates within the vertically surrounding stator. The slurry to be treated in accordance with the invention is passed through that gap under pressure.

Further instrumentalities useful in effecting high speed fluid shear are discussed in the aforementioned reference to Perry and Chilton.

Passage of the clay slurry through a narrow pressurized gap in accordance with steps (i.3) and (ii.3) of the invention yields results that differ fundamentally from what occurs where only conventional blades or disc-type mixers such as a Waring Blender or a Cowles dissolver are utilized. This can be appreciated by comparing the shearing mechanisms imposed upon a fluid in a Cowles high speed dissolver—as may be used in the dispersing steps (i.1) and (ii.1) of the process of the present invention—with those imposed by the Manton-Gaulin mill—as may be used in steps (i.3) and (ii.3) of the process according to the present invention.

In the Cowles high speed dissolver shear is imposed upon a fluid by smashing actions of the blades (mechanical energy) and by smearing arising from laminar flow. Of the two, the smearing mechanism is the more important, and the efficiency of dispersion is determined by the stirring design configuration (rounds per minute, blade size, container size and shape). Swirling, turbulent flow creates efficient mixing but most significantly, intermingled pockets remain undispersed. Conversely, the laminar flow pattern may fail to provide efficient mixing, but the drag of layers over each other tears any clumps of particles apart, and efficient dispersion is obtained. Additionally, the more viscous the fluid, the more effective is the tearing, and the efficiency of the Cowles dissolver increases with increasing viscosity.

In contrast, the Manton-Gaulin mill allows the product to enter an expansion valve at a very high pressure and low velocity. As the product enters the close clearance area between the valve and the valve seat there is a rapid increase in velocity to the order of 300 m/sec with a corresponding decrease in pressure arising from the Bernoulli effect. This allows the formation of bubbles which implode with extreme energy as the product velocity decreases upon leaving the valve seat area. This promotes the creation of shock waves which induce shearing by collision; this process is known as cavitation. In contrast to the behavior of the Cowles apparatus, the efficiency of the Manton-Gaulin mill decreases with increasing viscosity arising from rapid dissipation of shear waves.

It can be shown the shear stress in a typical Cowles dissolver is approximately 2013 dynes/cm$^2$. This assumes a fluid density of 1.0 g/cm$^3$ and a circular rim blade velocity of approximately 2000 cm/sec for a dissolver with a 4 inch (10.2 cm) blade.

Although the Manton-Gaulin mill does not employ laminar flow as a shearing mechanism, assuming a laminar model may give an upper bound to the shear rate and shear stresses encountered upon cavitation. Because of the extreme pressure shearing of the order of magnitude of laminar stress may be encountered.

Assuming this and a reasonable distance between the valve and valve seat (100 μm) a shear rate may be estimated from manufacturer specifications as about $2.9 \times 10^6$ sec$^{-1}$. The shear stress can then be shown to be $8.8 \times 10^7$ dynes cm$^{-1}$.

From the foregoing it may be concluded that at least the following differences exist between a Cowles dissolver and a Manton-Gaulin device:

1. The Manton-Gaulin mill operates on the principle of cavitation involving extremely high particle velocities and turbulent flow. The Cowles apparatus operates at low shear rates with efficient dispersion arising from laminar flow.

2. The efficiency of the Cowles disperser increases with increasing viscosity; that of the Gaulin apparatus decreases.

3. Clay particles in suspension experience much higher shear stresses and shear rates in the Gaulin apparatus, although these are not amenable to direct calculation.

The use of high speed fluid shear in the present invention is not only important in providing the benefits for the smectite (step ii.3) which are discussed in the foregoing patents; but moreover in the instances of the sepiolite and/or palygorskite (step i.3), such high speed fluid shearing acts to "debundle" the otherwise "bundled" type of structures which exist in the latter minerals. The hormite clays exist as needle-like structures, whereby the single needle form a needle felt. The term "debundling" in the present context means to individualize single needles from the needle felt.

In step iii. of the process according to the present invention the clay slurries as prepared in steps i. and ii. are combined. Before combining the slurries, their clay contents are determined by drying 10 g of each slurry at 130° C. for 90 min, followed by cooling to room temperature. The amounts of the slurries formed in steps i. and ii., which are to be combined in step iii., depend on the desired ratio of hormite clay and smectite clay in the resultant combined clay slurry (c). The minimum requirement is that the hormite clay content exceeds the smectite clay content in combined clay slurry (c).

Step iv. of the process according to the present invention, i. e. treating the combined clay slurry (c) with one or more quaternary alkyl-ammonium salts is preferably carried out at temperatures exceeding room temperature (i. e. 25° C.). A preferred temperature range is from 40° C. to the boiling temperature of the slurry at standard pressure, more preferred 40 to 80° C., even more preferred 50 to 70° C., as e. g. 60° C.

Preferably the one or more quaternary alkyl-ammonium salts are added to the combined clay slurry (c) under agitation of the combined clay slurry (c), as e. g. stirring of the slurry.

The amount of the one or more quaternary alkyl-ammonium salt(s) in relation to 100 g of clay in the combined clay slurry (c) typically ranges from 5 mmol to 80 mmol, preferably 20 to 65 mmol, and more preferred 30 to 55 mmol. Where the mixed mineral organoclay additive is intended to be used in high temperature applications a more preferred range is 5 to 50 mmol, and even more preferred 10 to 35 mmol of the quaternary alkyl-ammonium salt per 100 g of the combined clay in the slurry. For many other thixotropic applications a range of about 25 to 80 mmol, and preferably 35 to 65 mmol, of the quaternary alkyl-ammonium salt is used per 100 g of the combined clay in the slurry.

Preferably the thus produced quaternary alkyl-ammonium salt treated mineral clay mixture formed in step iv. is separated from the aqueous medium as described in step v. The separation can be achieved by all conventional means which are typically used to separate an insoluble material from the surrounding liquid phase, as e.g. filtration, centrifugation etc. Most preferred the quaternary alkyl-ammonium salt treated mineral clay mixture is filtered off, preferably supported by applying a vacuum. The resultant mixed mineral organoclay product is preferably dried, which is most preferably done at elevated temperature, as e. g. at a temperature in the range from 40 to 80° C., more preferred 50 to 70° C., as e. g. 60° C. Typical and acceptable residual amounts of moisture contained in resultant quaternary alkyl-ammonium salt treated mineral clay mixture are below 10 weight-%, preferably below 8 weight-%, even more preferred below 6 weight-% and most preferred below 4 weight-%, based on the total weight of the quaternary alkyl-ammonium salt treated mineral clay mixture and typically range from 1 or 2 weight-% to 6 weight-% based on the total weight of the quaternary alkyl-ammonium salt treated mineral clay mixture.

If desired, e. g. for better handling, the solid quaternary alkyl-ammonium salt treated mineral clay mixture particles may be reduced in size by grinding, milling or the like.

The second embodiment of the above general process of manufacturing the mixed mineral organoclay additive of the present invention differs from the first embodiment, in that steps (i.3) and (ii.3) are omitted and that step (iii.) is followed by subjecting the combined clay slurry (c) to high speed fluid shear before treating the combined clay slurry (c) with one or more quaternary alkyl-ammonium salts in step (iv.). The high speed fluid shear conditions are the same as described above.

All of the aforementioned process steps can be transferred into an industrial-scale production. Industrial-scale production requires the adaption of processing devices used. For example, for drying and milling purposes among others the following general methods are suitable to be used in an industrial scale production of the mixed mineral organoclay additive produced according to the process of the present invention: dry milling, flash drying, fluid bed drying, vacuum drying, jet mill drying, drum drying, and chamber drying. In some of the aforementioned drying processes an integrated milling step is included, e.g. spray drying. If as drying process is used, which does not have an integrated milling process, an additional milling step has to be performed, e.g. by using an air classifying mill. Drying temperatures can individually be adjusted to achieve the required water content. Filtration procedures are usually performed in filter presses. Manufacturing of the aqueous hormite clay slurry (a) and the aqueous smectite clay slurry (b) is preferably carried out at ambient temperature, whereas the treatment of the combined clay slurry (c) with one or more quaternary alkyl-ammonium salts is preferably carried out at temperatures exceeding ambient temperature. A preferred temperature range is from 40° C. to the boiling temperature of the slurry at standard pressure, more preferred 40 to 80° C., even more preferred 50 to 70° C., as e. g. 60° C.

The Mixed Mineral Organoclay Rheology Additives as Prepared According to the Process of the Present Invention While typical organoclays are made out of one kind of clay particles, e.g., bentonite or hectorite, the mixed mineral organoclay rheology additives according to the present invention are different. They are, by design, built out of several clay materials. They are built out of different clays with different-shaped particles. Different-shaped clays are usually mined and purified separately. At least at the step of rendering the surfaces hydrophobic they are combined in one reaction vessel.

The unique shape of these mixed minerals contributes to their unique performance. Due to a mix of platelet-shaped, ribbon-shaped and/or pipe-shaped clays, the product particles cannot be stacked parallel and as dense as the uniformly platelet shaped conventional organoclays. The various particles are not as close to each other. Translated into application properties, this means that the particles in mixed mineral organoclay rheology additives can be separated from each other more easily than the particles in conventional organoclays. This gives quicker and easier dispersion, even easier than easy-dispersible conventional organoclays.

The microscopic structure can be seen in macro by exhibiting a lower bulk density compared to conventional organoclays. But compared to fumed silica, the density is still much higher. Even for mixed mineral organoclay rheology additives that give a similar performance to fumed silica, it is easier to handle them due to their higher density. Mixed mineral organoclay rheology additives are less dusting and need less space in bags and warehouses.

Beside the above mentioned exceptional properties of the "conventional" mixed mineral organoclay rheology additives, the mixed mineral organoclay rheology additives as produced by the process according to the present invention provide an even higher thickening effect and in particular a higher thixotroping effect compared to "conventional" ones. This is in particular true for the selection of the specific hormite clays used in the process of manufacture of the mixed mineral organoclay rheology additives. The herein used hormite clays have a low methylene blue exchange capacity as will be described in more detail below.

Also an object of the present invention is the mixed mineral organoclay additive comprising or consisting of the quaternary alkyl-ammonium salt treated mineral clay mixture.

Hormite Clays as Used in the Process According to the Present Invention

Hormite clays belong to the group of phyllosilicates. The hormite clay or hormite clays to be used in the manufacture of the mixed mineral organoclay rheology additives of the present invention are sepiolites and/or palygorskites (also known as attapulgites). Of the two mentioned hormite clays, sepiolite is preferred for use in the invention. Both sepiolite and palygorskite contain a continuous two-dimensional tetrahedral sheet of composition, but they differ from the other layer silicates in lacking continuous octahedral sheets. Further details of the structures of these minerals, including the structural distinctions between the two idealized structures of sepiolite and palygorskite, may be found in "Developments in Palygorskite-Sepiolite Research", Galán and Singer, Elsevier, 2011.

Both hormite clays have a very similar idealized structure. In nature sepiolites and palygorskites differ from idealized structures but can usually easily be characterized as such. According to recent literature there is no compositional gap between sepiolites and palygorsiktes, but on the contrary, a continuous series of minerals between the idealized structures exists (Galán and Singer, "Developments in Palygorskite-Sepiolite Research", Elsevier, 2011, pages 49-51, in particular FIG. 8 at page 51).

The sepiolites and palygorskites as employed herein are raw clay materials which may be mined at the same mining site or different mining sites around the world. Such material inevitably contains some impurities like quartz or dolomite. The terms "sepiolite" and "palygorskite" as used herein are to be understood to refer to raw materials preferably containing at least 90 wt.-%, more preferable at least 95 wt.-% and even more preferably at least 97 wt.-% and best at least 99 wt.-% of the respective hormite clay morphology in the raw material. In mineralogy powder X-ray diffraction pattern is a typical tool for detecting crystalline impurities in sepiolites and palygorskites by the presence of characteristic reflection of these impurities in powder X-ray diffraction patterns. Therefore impurities of quartz, cristobalite, calzite, dolomite etc. can be detected easily as they show characteristic reflection in powder X-ray diffraction patterns at different 2θ values than sepiolites and palygorskite samples.

The hormite clays to be used in the context of the present invention possess a very low methylene blue exchange rate. There is a correlation between the clays ability to interact or react with cations and the methylene blue exchange rate, since methylene blue itself possesses a positive charge at a nitrogen atom. However, it is not a quaternary ammonium salt.

The adsorption of methylene blue on clays in general is a widely spread used method when investigating the ability of clays to interact with cations. Many scientific publications on this field focus on smectite clays. However, several authors also investigated the methylene blue adsorption on sepiolites and palygorskites, as e. g. Rytwo et al. in Clays and Clay Minerals, 46(3), 340-348, 1998, "Adsorption of Monovalent Organic Cations on Sepiolite: Experimental Results and Model Calculations" or Shariatmadrari et al. in Clays and Clay Minerals, 47(1), 44-53, 1999, "Sorption of Selected Cationic and Neutral Organic Molecules on Palygorskite and Sepiolite". A detailed description on how to determine the methylene blue exchange capacity of the hormite clays used in the present invention is found in the experimental section of the present invention.

Galán and Singer in "Developments in Palygorskite-Sepiolite Research", Elsevier, 2011, page 367 refer to Rytwo et al. "Adsorption of Monovalent Organic Cations on Sepiolite: Experimental Results and Model Calculations", Clays and Clay Minerals, 46(3), 340-348, 1998 for experimental results on methylene blue adsorption on sepiolites in amounts of up to 57 mmol/100 g sepiolite clay.

The inventors of the present invention also carried out some analysis of different sepiolite clay samples (obtained from one mining site in Spain) and found methylene blue exchange rates from about 10 to about 46 mmol/100 g sepiolite clay coming from this mining site. Nevertheless, not all of the hormite clays obtained from the mining site turned out to be suitable to be used in the process according to the invention. To the contrary, it turned out that only such hormite clays having a methylene blue exchange capacity below 20 mmol methylene blue per 100 g of the one or more hormite clays in dry state lead to the additives having the desired rheological effect. The term "one or more hormite clays in dry state" as used within the present application refers to the dry hormite clay content obtained from an aqueous hormite clay slurry (a) when a 10 g sample of the slurry is dried at 130° C. for 90 min.

In the context of the present invention it is even further preferred that the one or more hormite clays have a methylene blue exchange capacity of up to 18 mmol per 100 g of the one or more hormite clays in dry state or even only up to 17 mmol per 100 g of the one or more hormite clays in dry state. Preferred ranges for the methylene blue exchange capacity are from 5 to 18, even more preferred 8 to 17 and most preferred 10 to 17 mmol per 100 g of the one or more hormite clays in dry state.

Whereas smectite clays usually possess a high methylene blue exchange capacity and are commonly used in the production of organoclays, it was surprising that only such additives of the invention will exhibit the rheological effects described above, when—in the preparation of the additives of the present invention—one or more smectite clays are combined with such one or more hormite clays, having a low methylene blue exchange capacity, only.

The above finding is even more surprising taking into account what is explained in the introductory prior art part of this specification. Generally a low degree of organic modification reduces the compatibility of natural clays to be used in non-aqueous formulations. Usually one of skill in the art will try to improve the capability of natural clays to interact or react with organic matter. Sometimes this is done by modifying such clays with hydrophobic alkoxy silanes.

In the present invention, to the contrary, it is not sought to equip the hormite clays with a large number of hydrophobic groups, but to use such hormite clays which per se exhibit a low tendency to interact with hydrophobic compounds such as e. g. quaternary alkyl-ammonium salts. Usually one of skill in the art would have expected that hormite clays with a high methylene blue exchange capacity would be preferred, instead.

As used herein, the term "fraction of one or more hormite clays" is equivalent to the term "hormite clay fraction containing or consisting of one or more hormite clays". This fraction of one or more hormite clays is therefore distinct from a "fraction of one or more smectite clays" i. e. a "smectite clay fraction containing or consisting of one or more smectite clays".

The term "one or more hormite clays" is to be understood in a broad sense and includes the possible presence of different types of hormite clay, i. e. the presence of sepiolite and palygorskite, but it also includes the possible presence of different batches of one type of clay, e.g. different sepiolite clay batches or different palygorskite clay batches or mixtures thereof. The same applies to the term "one or more smectite clays".

The term "different batches" as used herein encompasses the possibility that those batches are from different mining sites or from different mine work places within one mining site.

If different batches of hormite clay are contained in the hormite clay fraction, it is most preferred that each batch of hormite clay contained in the hormite clay fraction fulfills the requirement to exhibit a methylene blue exchange capacity below 20 mmol methylene blue per 100 g of the hormite clay batch in dry state. However, it is also possible that one or more batches of hormite clay contained in the hormite clay fraction lie outside this requirement, i.e. exhibit a methylene blue exchange capacity of more than or equal to 20 mmol methylene blue per 100 g of the hormite clay batch in dry state, provided that the hormite clay fraction as a whole fulfills the requirement to exhibit a methylene blue exchange capacity below 20 mmol methylene blue per 100 g of the hormite clay batch in dry state.

In case different hormite clay batches are contained in the fraction of one or more hormite clays and one or more of those batches exhibits a methylene blue exchange capacity of more than or equal to 20 mmol methylene blue per 100 g of the hormite clay batch in dry state, such batches should preferably exhibit a methylene blue exchange capacity below 30 mmol methylene blue per 100 g of the hormite clay batch in dry state, even more preferred such batches should exhibit a methylene blue exchange capacity below 25 mmol methylene blue per 100 g of the hormite clay batch in dry state, and most preferred such batches exhibit a methylene blue exchange capacity below 22 mmol methylene blue per 100 g of the hormite clay batch in dry state.

In case different hormite clay batches are contained in the fraction of one or more hormite clays and one or more of those batches lie outside the requirement for the hormite clay fraction to exhibit a methylene blue exchange capacity below 20 mmol methylene blue per 100 g of the hormite clay batch in dry state, as lined out in the previous paragraph, it is preferred that the one or more hormite clay batches which fulfill the requirement to exhibit a methylene blue exchange capacity below 20 mmol methylene blue per 100 g of the hormite clay batch in dry state are contained in the hormite clay fraction with a minimum content of at least 25% by weight, more preferably at least 30 by weight, even more preferred at least 35% by weight, even more preferred at least 40% by weight, even more preferred at least 50% by weight, even more preferred at least 60% by weight, even more preferred at least 75% by weight and most preferred at least 80% by weight, based on the total weight of the hormite clay fraction.

If there is for example a need for an exceptionally good thickening effect in a specific application, it might however become necessary to only use hormite clay batches inside the required range for the hormite clay fraction to exhibit a methylene blue exchange capacity below 20 mmol methylene blue per 100 g of the hormite clay batch in dry state or at least to use a high amount of such batches, based on the total weight of the hormite clay fraction. In case, that not all hormite clay batches fulfill the requirement set for the complete hormite clay fraction, it should, in order to further improve the thickening quality of the additive, taken into consideration to use only such batches outside the requirement set for the complete hormite clay fraction, which are close to the requirement for the complete hormite clay fraction, i.e. those which are only slightly outside this requirement.

Typically, a sample of the hormite clay fraction(s) to be used in i. forming an aqueous hormite clay slurry (a), is tested as described within the present invention. On the basis of the result of the testing the hormite clay materials which meet the above requirements are used in the manufacturing process according to the invention.

Smectite Clays as Used in the Process According to the Present Invention

As utilized in the present specification, the term "smectite clays" refers to the general class of clay minerals with expanding crystal lattices, with the exception of vermiculite. This includes the dioctahedral smectites which consist of montmorillonite, beidellite, and nontronite, and to the trioctahedral smectites, which includes saponite, hectorite, and sauconite. Also encompassed are smectite-clays prepared synthetically, e.g. by hydrothermal processes as disclosed in U.S. Pat. No. 3,252,757; U.S. Pat. No. 3,586,468; U.S. Pat. No. 3,666,407; U.S. Pat. No. 3,671,190; U.S. Pat. No. 3,844,978; U.S. Pat. No. 3,844,979; U.S. Pat. No. 3,852,405; and U.S. Pat. No. 3,855,147.

Preferably, the smectite is a natural or synthetic clay mineral selected from the group consisting of hectorite, montmorillonite, bentonite, beidelite, saponite, stevensite and mixtures thereof. Particularly preferred smectites are saponite and hectorite.

Mixture of Hormite Clay(s) and Smectite Clay(s) in Form of their Aqueous Slurry

Before being treated with quaternary alkyl-ammonium salts the one or more hormite clay and the one or more smectite clay are mixed in form of aqueous slurries in such ratio, that the weight of the one or more hormite clay(s) exceeds the weight of the one or more smectite clay(s), based on the total weight of clay. The weight of the clay contained in each slurry can be determined by drying a part of the respective slurry (e. g. 10 ml) at 130° C. for 90 min. The dry residue is the amount of clay contained in relation to the weight of the slurry (e. g. 10 ml) before drying.

Most preferably no other clays but the hormite and smectite clays are contained in the combined clay slurry, despite of impurities that might be contained. If impurities are contained the amount thereof should preferably not exceed 10 wt.-%, even more preferred 5 wt.-%, even better 3 wt.-% and most preferred the amount should not exceed 1 wt.-% based on the total weight of clays in the combined clay slurry.

Preferably the amount of the one or more hormite clays in the combined clay slurry is from more than 50 to 95 wt.-%, even more preferred from 60 to 90 wt.-% and most preferred from 75 to 85 wt.-% based on the total weight of clays in combined clay slurry.

Preferably the amount of the one or more smectite clays in the combined clay slurry is from 5 to 50 wt.-%, even more preferred 10 to 30 wt.-% and most preferred 15 to 25 wt.-% based on the total weight of the clays in the combined clay slurry.

Most preferred the amount of the one or more hormite clays in the combined clay slurry is from 75 to 85 wt.-%, while the amount of the one or more smectite clays is from 15 to 25 wt.-%, both based on the total weight of the clays in the combined clay slurry.

The above weight-% ranges apply irrespective of whether the hormite clay fraction contains only 1 type of hormite clay, as e. g. sepiolite, or more than one type of hormite clay. Preferably the hormite clay fraction contains only sepiolite clay.

The above weight-% ranges apply irrespective of whether the smectite clay fraction contains only 1 type of smectite clay, as e. g. saponite or hectorite, or more than one type of smectite clay, like a mixture of saponite and hectorite. Preferably the smectite clay fraction contains only saponite or hectorite clay.

The above amounts are to be understood before being treated with the quaternary alkyl-ammonium salts.

Quaternary Alkyl-Ammonium Salts as Used in the Process According to the Present Invention The quaternary alkyl-ammonium salts employed for treating the clays in the combined clay slurries preferably comprise quaternary alkyl-ammonium salts containing the same or different, straight-chain and/or branched, saturated and/or unsaturated alkyl groups with 1 to 22 carbon atoms and/or aromatic groups with 6 to 14, preferably 6 to 10 carbon atoms, preferably benzyl groups, whereby the counter-ion moiety is preferably selected from the group consisting of halogenide, such as chloride and bromide, methylsulfate, sulfate, nitrate, hydroxide, acetate, phosphate and mixtures thereof, most preferably chloride, bromide and methylsulfate. "Treating" the clay mixture with one or more quaternary ammonium salts encompasses chemically reacting as well as physical and/or chemical adsorption.

Particularly preferred quaternary alkyl-ammonium salts can be described by the general formula $(C_{1-10}\text{-alkyl})_n(C_{12-22}\text{-alkyl})_m(\text{benzyl})_p\ N^+X^-$, wherein $n+m+p=4$ and $n=1$, 2 or 3, $m=1$ or 2, $p=0$ or 1 and $X^-$=halogenide, sulfate, nitrate, hydroxide, acetate or phosphate, preferably chloride, bromide or methylsulfate. Especially preferred quaternary alkyl-ammonium salts are dimethyl di($C_{14-18}$-alkyl) ammonium chloride, methyl benzyl di($C_{14-18}$-alkyl) ammonium chloride, dimethyl benzyl ($C_{14-18}$-alkyl)ammonium chloride, and dimethyl (2-ethylhexyl) ($C_{14-18}$-alkyl)ammonium sulfate, trimethyl ($C_{14-18}$-alkyl)ammonium chloride and mixtures of two or more of the preferred choices. The above $C_{14-18}$ alkyl group is preferably a hydrogenated tallow-alkyl group.

Most preferred are benzyl-dihydrogenated tallow-methyl ammonium chloride and dimethyl-dihydrogenated tallow ammonium chloride and mixtures thereof. If a mixture of both is employed it is even more preferred to use the benzyl-dihydrogenated tallow-methyl ammonium chloride in an amount of more than 50 weight-% like 60, 70, 75 or 80 weight-%, based on the total amount of benzyl-dihydrogenated tallow-methyl ammonium chloride and dimethyl-dihydrogenated tallow ammonium chloride.

The clays in the combined clay slurry are typically treated with 5 to 80 mmol of the quaternary alkyl-ammonium salt per 100 g of clay. Where the organoclay is used in high temperature applications, like in drilling fluids, but not limited to those, a more preferred range is 5 to 50 mmol, and even more optimal, 10 to 35 mmol of the quaternary alkyl-ammonium salt per 100 g of the clay mixture. For many other thixotropic applications a range of about 25 to 80 mmol, and preferably 35 to 65 mmol, of the quaternary alkyl-ammonium salt is used per 100 g of the clay in the slurry.

The used amount can be adjusted to the cation exchange capacity of the combined clay slurry, i. e. the slurry containing the hormite and smectite clay fractions, and should preferably be at least 75% of the cation exchange capacity of said clay slurry.

Uses According to the Present Invention

Yet another primary object of the present invention is the use of at least one of the mixed mineral organoclay additives obtained by the process according to the present invention as thickener in liquid compositions, preferably in non-aqueous liquid compositions which even more preferably comprise at least one unsaturated polyester.

Unsaturated Polyester Containing Formulation as Employed in the Present Invention Unsaturated polyester containing formulations contain per definition at least one unsaturated polyester. The term "unsaturated polyester" is used consistent with understanding of the person skilled in the art of unsaturated polyesters (UP) and unsaturated polyester resins (UP resins). Accordingly the term "unsaturated polyester resin" is herein to be understood as being a reaction resin consisting of polyesters, were at least one of the components forming the polyester, i.e. mostly a multivalent alcohol and preferably mostly a multivalent carboxylic acid is ethylenically unsaturated and which is copolymerizable with monomeric polymerizable compounds. With other words the "unsaturated polyesters" of the present invention need to contain one or more ethylenically unsaturated carbon carbon double bonds which are apt to react with ethylenically unsaturated monomers. Preferably the at least one unsaturated polyester is blended with at least one ethylenically unsaturated monomer serving as crosslinking agent. The curing reaction is the copolymerization of the at least one ethylenically unsaturated monomer with the double bonds of the unsaturated polyester. Unsaturated polyesters are preferably blended with ethylenically unsaturated monomers as the unblended unsaturated polyesters are often brittle at ambient temperature and difficult to handle. Therefore, whenever unsaturated polyesters are synthesized in a plant, they are preferably mixed with an ethylenically unsaturated monomer in the molten or liquid state. The underlying crosslinking principle of unsaturated polyester containing formulations can preferably be understood as the reaction of the preferably linear unsaturated polyesters containing double bonds with monomeric, polymerization capable compounds, e.g. ethylenically unsaturated monomers. This linkage in the presence of polymerization initiators is called copolymerisation. It depends on the general curing conditions as well as on the used ratio between the unsaturated polyester and the ethylenically unsaturated monomer if the linkage is formed by only one unit of the ethylenically unsaturated monomer or by a chain of the monomers. For further information it is referred to Kittel "Lehrbuch der Lacke and Beschichtungen", volume 2, second edition, 1998, pp. 473-485.

It is preferred that the amount of olefinic unsaturation, ranges from 10 to 75 olefinic groups per 100 ester groups. The olefinic unsaturation is preferably derived from the carboxylic acid although the diol may also be unsaturated. Typical diols are ethylene glycol and propylene glycol. Typical unsaturated acids include maleic acid, fumaric acid and phthalic acid or anhydrides of these acids, as will be described in more detail below. Such polyesters are made by conventional techniques of esterification. Preferably, unsaturated polyesters, useful for preparing the polyester compositions, have weight average molecular weights of about 400 to 10,000 (determined by gel permeation chromatography) and preferably acid numbers in the range of from 20 to 45 mg KOH per gram of polyester.

Unsaturated Polyesters for Use in the Present Invention

In general unsaturated polyester can be synthesized according to the synthesis of alkyd resins. Particularly, the azeotropic esterification as a variation of melt condensation has become important, especially for sensitive starting materials. To remove water, which is formed during the reaction toluene and xylene might be used as entraining agents. As the used monomers are unsaturated compounds, the reaction has to be performed under the exclusion of atmospheric oxygen, preferably in inert gas atmosphere to avoid a prematurely polymerization of the starting compounds. The reaction temperature of the esterification should not exceed a temperature range of 150 to 200° C. The polymerization progress can be monitored by determination of the acid value and measurement of viscosity. Usually the ethylenically unsaturated monomer, being preferably styrene, is mixed into the liquid or molten unsaturated polyester. To avoid a prematurely polymerization, inhibitors such as toluhydroquinone, hydroquinone, or tertiary butylcatechol are added preferably to the ethylenically unsaturated monomer and possibly also to the melt of the unsaturated polyesters.

In theory it is possible that the mandatory carbon-carbon double bonds being capable of polymerization can be present in both of the starting components, the dicarboxylic acid component as well as in the diol component. But technically important are only such unsaturated polyester resins in which the carbon-carbon double bond is present in the dicarboxylic acid. Preferably maleic acid and fumaric acid are used as dicarboxylic acids in the production of unsaturated polyesters, wherein as the maleic acid is preferably used in the anhydride form. In view of economic reasons maleic acid or maleic acid anhydride is the most favorable dicarboxylic acid. The use of fumaric acid compared to the use of maleic acids results in products having a higher mechanical strength and chemical resistance. In addition, fumaric acid is more reactive than maleic acid. Less common, however, in principle for example, mesaconic acid, citraconic acid and itaconic acid are also suitable as unsaturated dicarboxylic acids.

Due to the fact that unsaturated polyesters having a high amount of carbon-carbon double bonds will result in a highly crosslinked network, the resulting products tend to be brittle. Therefore, usually not only unsaturated dicarboxylic acids are used in the synthesis of unsaturated polyesters, but also saturated aliphatic or saturated cycloaliphatic dicarboxylic acids and/or aromatic dicarboxylic acids are used to tailor the properties of the crosslinked product.

Phthalic acid and its anhydrides are particularly suitable to be used as aromatic dicarboxylic acids to produce crosslinked polyesters having a good elasticity. Furthermore it is herein particularly preferred to use orthophthalic acid or its anhydride in the production of duromeric synthetic materials.

As alcohol component for the production of unsaturated polyesters diols are almost exclusively used due to the fact that higher functional alcohols, such as triols, would lead to highly crosslinked products often having a too high viscosity. Therefore, the exclusive use of diols is preferred in the production of unsaturated polyesters.

The diols are preferably selected from the group consisting of 1,2-propane diol, 1,3-propane diol, ethylene glycol, diethylene glycol, dipropylene glycol, triethylene glycol, neopentyl glycol, 2-methyl-2-ethyl-propane-1,3 diol, hydrated bisphenol A and oxalkylated bisphenol.

Ethylenically Unsaturated Monomers for Use with the Unsaturated Polyesters

The term ethylenically unsaturated monomers describes those monomers containing a carbon-carbon double bond. For example, the carbon-carbon double bond can be present in form of a vinyl group, allyl group, acrylate group, methacrylate group or in a non-terminal region of the monomer. Preferably, the ethylenically unsaturated monomers should have a low vapor pressure, should be able to serve as a solvent for the unsaturated polyester and should well copolymerize with the unsaturated polyester.

Preferably ethylenically unsaturated monomers are selected from the group of styrene, alpha-methylstyrene, methyl acrylate, methyl methacrylate, vinyl acetate, divinyl benzene, diallyl phthalate, triallylcyanurate, and triallyl phosphate. Styrene is the most preferred ethylenically unsaturated monomer.

Usually the fraction of the ethylenically unsaturated monomer is in the range of 20 to 50% by weight, preferably 25 to 40% by weight, based on the sum of the unsaturated polyester and the ethylenically unsaturated monomer.

Catalysts and Initiators for Use in the Unsaturated Polyester Containing Formulation The two components, the ethylenically unsaturated monomer and unsaturated polyester, start reacting by the addition of a polymerization initiator. As polymerization initiators for the conventional curing (crosslinking) preferably peroxides and hydroperoxides can e.g. be used, which are suitable to form starting radicals by their decomposition. Dibenzoyl peroxide, cumyl hydroperoxide and t-butyl perbenzoate represent examples of the broad range of commercially available initiators.

Decomposition of the aforementioned peroxides or hydroperoxides is preferably achieved by catalytic action with certain metal salts. Particularly, cobalt salts can successfully be used to accelerate radical formation because of their ability to change valency. Amines, such as for example dimethylamylamine (DMAA), might be used as alternatives to or in combination with cobalt salts. Their effect is based on radical-forming hydrogen transfer.

Both groups of components have proved successful in practice. Whereas the highly reactive amine is gradually used up by the curing process, thereby diminishing its effect, the cobalt salt acts purely catalytically with relatively low initial reactivity but better through-hardening. Therefore, preferably blends of the two components are used to ensure the best processing properties.

Further Fields of Application of the Mixed Mineral Organoclay Rheology Additives as Produced According to the Present Invention The mixed mineral organoclay additives as produced according to the process of the present invention can be used as thickening agent, more particularly as thixotroping agent.

The mixed mineral organoclay additives as produced according to the process of the present invention are typically used in a wide variety of liquid organic compositions. "A composition" in the present context is a formulation containing the additive of the present invention and at least one further chemical entity. "A liquid composition" in the present context is a composition which is in a liquid state at the temperature at which it is used and supplemented with the additive as produced according to the process of the present invention. Preferably the liquid organic compositions are liquid at temperatures below 40° C., more preferably they are liquid at 25° C. (i. e. room temperature). A "liquid organic composition" is a liquid composition containing the additive as produced according to the process of the present invention and at least one further chemical entity belonging to organic entities. Such organic entities can e. g. be compounds or polymers, or mixtures thereof and with each other. Beside non-soluble ingredients, as e.g. fillers and pigments which may also be contained in the liquid organic compositions, the organic entities which differ from the additive of the present invention are preferably contained in an amount of at least 50 wt.-% more preferably in an amount of 60 wt.-% and most preferably in an amount of 70 wt.-% or more.

Examples of liquid organic compositions are such as coating materials, sealants, adhesives, oil drilling fluids, gas drilling fluids, composite materials like nanocomposites, and moulding compounds or simply a liquid organic composition which contains besides the rheology additive only one or more organic solvents.

Such liquid organic compositions contain the mixed mineral organoclay rheology additive as produced according to the process of the present invention typically in an additive amount from 0.1 to 10 wt.-%, more preferably 0.1 to 8 wt.-% and even more preferred 0.5 to 5 wt.-%, based on the total weight of the liquid organic composition.

A big challenge for conventional organoclays are unsaturated polyester containing compositions such as e. g. coatings, adhesives, sealants, moulding compounds and composite materials. Particularly unsaturated polyester coating compositions containing ethylenically unsaturated monomers give few possibilities to optimize the dispersibility of conventional organoclays by low concentrated pregels.

Hence, typical systems where conventional organoclays fail are high-solid systems, and in particular systems which do not contain solvents which significantly evaporate during the cure of the formulation.

While the effects of the mixed mineral organoclay rheology additives as produced according to the process of the present invention are most pronounced in problematic systems like the unsaturated polyester containing composition of the present invention, their thickening and thixotroping effect is of course not limited to this specific system. To the contrary, the thickening and more particularly thixotroping effects achieved with the use of the mixed mineral organoclay rheology additives as produced according to the process of the present invention are of course also developed in other liquid organic systems or simply in organic solvents.

Therefore the organoclay products as produced according to the process of the present invention are found to display unexpected and highly desirable properties when used as a thixotrope in various organic based systems besides the unsaturated polyester resin containing compositions of the present invention. For example, when used in gelling of epoxy resins, it was found that the additives of the invention can be stirred and dispersed directly in an epoxy resin solution, and will provide highly satisfactory gelling properties. Epoxy resins contain in average more than one oxirane ring per molecule. They can be cured with so-called hardeners (also called "curing agents") by reaction of the oxirane ring with a functional group of the hardener which is reactive towards the oxirane ring. Commonly used epoxy resins are formed by reacting reactive phenols, alcohols, acids and/or amines with epichlorohydrin. Most commonly the oxirane ring is present in the epoxy resins in form of a glycidyl group. The number of reactive base entities, which form epoxy resins by reaction of epichlorohydrin is almost unlimited, resulting in a large number of technically important resins. Moreover unsaturated aliphatic and cycloaliphatic compounds may be epoxidized with e. g. peracetic acid.

The additive as produced according to the process of the present invention is generally used in coating, adhesive or sealant compositions in an amount such that the final composition will have a flow curve which allows application but prevents drainage from or sag of the material from the surface to which the ready to use formulations are applied. In general, the liquid compositions of the present invention will contain an amount of 0.1 to 10 wt. %, preferably 0.1 to 8 wt.-% and even more preferred 0.5 to 5 wt.-%, based on the total weight of the ready to use coating composition.

Furthermore the rheology additives as produced according to the process of the present invention yield surprising results when utilized in high temperature drilling fluids. By use of such additives as produced according to the process of the present invention an oil base environmentally benign drilling fluid composition can be provided which has a stable high viscosity and high gel strength at use temperatures up to at least 230° C. Such drilling fluid comprises a low toxicity biodegradable oil vehicle, and as a viscosifying agent, an additive as produced according to the process of the present invention.

The additives as produced according to the process of the present invention can also be used in preparing nanocomposites by any of the methods which are set forth in the prior referenced patents, and with a large variety of polymerizable polymers such as polyamides, epoxy resins, polyvinyl resins, polyacrylamides, etc. When used in composites such as nanocomposites, the additives of the present invention yield unexpected improvements in the mechanical and other properties of the composite, including with respect to tensile strength, tensile modulus and flex modulus, all of which are highly significant attributes for the plastics and similar formulators.

The invention will now be illustrated by examples, which are to be regarded as illustrative and not delimitative of the invention. Unless otherwise indicated to the contrary, all parts and percentages are by weight.

Preparation Examples

The following 8 hormite clay samples are sepiolite samples obtained from one mining site in Spain. The samples were controlled by X-ray diffraction for mineral impurities in house. The existence sepiolite, palygorskite is shown by a main peak (110) around 12.1 Angstroms and some smaller relating ones. The amount of crystalline impurities was detected by their material specific peaks in X-ray diffraction (XRD). The amount of crystalline quartz or dolomite impurities in all samples is lower than the detection limit of 0.2 wt.-%.

Determination of Methylene Blue Exchange Capacity (MBEC) Values

This method describes the measurement of the adsorption of methylene blue dye by the hormite clays used in the present invention. Generally a straight-line relationship exists between the MBEC and the cation exchange capacity (CEC) of the clays.

(1) A hormite clay slurry is prepared by milling raw hormite clay to coarse grind of approximately 2-3 mm (⅛" mesh) (mill: Brown Direct Driven Pulverizer UD32, Spatula thickness 0.05 inches (1.27 mm), Bico Brown International). 850 g of the milled clay are added to 7930 g of hot water (135° F., i.e. 57° C.) in a 5 gallon (18.93 liter) straight sided plastic pail (top: 11.9 inches (30.2 cm); bottom: 10.92 inches (27.7 cm); overall height: 13.31 inches (33.8 cm)) under agitation strong enough to yield a vortex. The suspension is stirred at highest possible speed (4100 rpm) to not lose suspension over the pail walls with a Cowles blade on a dissolver for 1 hour (Cowles Dissolver Model 1-VJ; 4 inch (10.2 cm) Cowles Hi Shear Impeller BO 4 AOB from Morehouse Cowles), whereby in the first 5 min of this 1 hour a 15 inch (38.1 cm) spatula is held into the side of the pail to act as a baffle, which helps the slurry to thicken faster. Then, after the 1 hour step, another 8120 g of hot water are mixed in. This suspension is screened on a 100 mesh sieve to remove coarse particles.

(2) A methylene blue solution (0.01 N) is prepared as follows. 4000 ml of deionized water are measured and poured into a 2 gallon sealable container. 0.85 ml glacial acetic acid are added. Subsequently 1.18 g anhydrous sodium acetate are added. Subsequently 14.80 g methylene blue (dry) EM Basic Blue 9 are added and 2 gallon container is sealed, well shaken and let sit overnight before use. The solution is stored in a dark place.

(3) The amount of aqueous slurry to be used for the test is determined by the following equation:

grams of hormite clay slurry=(0.4×100)/% solids (4) The required grams of hormite clay slurry are weigh into an Erlenmeyer Flask and deionized water is added to equal 90 grams for the total volume of slurry and water. The flask is placed on a student stirrer equipped with an 2-inch magnetic bar. The speed is adjusted to create a vortex to where the magnetic bar can be seen. An initial amount of methylene blue solution is added. This amount should be about 80% of the total amount of solution required to reach the endpoint. If the initial amount is not known, the methylene blue solution is added in increments of 1 ml. After each addition of methylene blue solution, the contents of the flask are mixed for 1 minute. Than one drop of liquid is removed with the stirring rod and placed on the filter paper. The (initial) endpoint of the titration is reached when dye appears as a blue or turquoise ring surrounding the dye solids. After this endpoint is reached, the solution is mixed for 3 minutes (during this time, the mixture can be checked every 1 minute). If the endpoint disappears, additional methylene blue solution is added and the solution is again mixed for 3 minutes (during this time, the mixture can be checked every 1 minute). This step may be repeated several times. The final endpoint is reached when the endpoint does not change after three minutes of mixing. The amount of methylene blue solution in milliliters used is recorded.

(5) The methylene blue exchange capacity is calculated as follows:

MBEC [mmol methylene blue per 100 g hormite clay (dry state)]=(MB×N×100)/grams of clay (dry state)

grams of clay (dry state)=(grams of slurry×% solids)/100

MB=ml of methylene blue solution required for the titration
N=0.01003 normality of methylene blue solution
The solids content (in % solids) is determined by drying a 10 g sample of the slurry at 130° C. for 90 min.

Preparation of Thickeners:
Preparation 1:
The sepiolite raw clay is milled to coarse grind of approximately 2-3 mm (⅛" mesh) (mill: Brown Direct Driven Pulverizer UD32, Spatula thickness 0.05 inches (1.27 mm), Bico Brown International). 850 g of the milled clay are added to 7930 g of hot water (135° F., i.e. 57° C.) in a 5 gallon (18.93 liter) straight sided plastic pail (top: 11.9 inches (30.2 cm); bottom: 10.92 inches (27.7 cm); overall height: 13.31 inches (33.8 cm)) under agitation strong enough to yield a vortex. The suspension is stirred at highest possible speed (4100 rpm) to not lose suspension over the pail walls with a Cowles blade on a dissolver for 1 hour (Cowles Dissolver Model 1-VJ; 4 inch (10.2 cm) Cowles Hi Shear Impeller BO 4 AOB from Morehouse Cowles), whereby in the first 5 min of this 1 hour a 15 inch (38.1 cm) spatula is held into the side of the pail to act as a baffle, which helps the slurry to thicken faster. Then, after the 1 hour step, another 8120 g of hot water are mixed in. This suspension is screened on a 100 mesh sieve to remove coarse particles. The suspension is subjected two times to a pass through a Manton-Gaulin homogenizer mill at 4500 psi (approximately 310 bar).

A saponite raw clay slurry is prepared in the same way. The amount of water is adjusted to yield an optimum processable viscosity. Additionally, after screening it is passed over a centrifuge for additional removing of coarse particles. It is passed through a Manton-Gaulin mill one time.

A mixed slurry is prepared containing a ratio of 80% sepiolite and 20% saponite on a dry base, meaning on the base of dried sepiolite and dried saponite, respectively. The general drying conditions for 10 g samples of any clay slurries are: 130° C. for 90 minutes, followed by cooling to room temperature in an exsiccator. The mix is heated to 60° C. and stirred to yield a vortex. 45 mmol/100 g clay of a mix of 75 wt.-% benzyl-dihydrogenated tallow-methyl ammonium chloride and 25 wt.-% dimethyl-dihydrogenated tallow ammonium chloride are added to the mix and are treated for 30 minutes. The resulting material is filtered on a vacuum funnel. The filter cake is dried in a blower oven at 60° C. to reach a residual of moisture of approximately 2-6%. Then it is milled on a pulverisette mill with a 0.2 mm sieve.

Preparation 2:
This is done as shown in preparation 1. Instead of saponite clay a hectorite clay is used. The amount of quaternary ammonium is increased to 49 mmol/100 g clay.

Application Examples

Liquid Composition for Use in the Present Invention
2.00 parts by weight of the thickener of preparation 1, was mixed into 14.69 parts by weight of styrene in a Dispermat at 4000 rpm for 10 minutes to form 16.69 parts by weight of Pregel 1. In the same manner 2.00 parts by weight of the thickener of preparation 2, was mixed into 14.69 parts by weight of styrene to form 16.69 parts by weight of Pregel 2. Thereof the following formulations 1 and 2, respectively, were prepared:

| Ingredients | Formulation 1 [parts by weight] | Formulation 2 [parts by weight] |
|---|---|---|
| Ortho-Polyester* | 185.50 | 185.50 |
| Byk A-555** | 0.60 | 0.60 |
| Pregel 1 | 16.68 | — |
| Pregel 2 | — | 16.68 |
| Dimethylacetoacetamide | 0.16 | 0.16 |
| Cobalt-octoate | 0.30 | 0.30 |

*fluid unsaturated orthophthalic acid based polyester (73 wt.-% orthophthalic acid based polyester in styrene; acid number: 26 mg KOH/g, viscosity (Brookfield RV #27, 50 rpm) = 2700 cps)
**silicon-free de-aerator (obtainable from BYK-Chemie GmbH, Wesel, Germany)

After the respective pregel portion of the formulation was produced, the remainder of the formulation was processed as follows: The ortho-polyester resin was added to a ½ pint metal can (diameter: 70 mm, height: 70 mm). Subsequently BYK A-555 and the respective Pregel 1 or 2 were added. The can was placed on a dispermat (dissolver disc: 30 mm; saw tooth) and mixed for 5 minutes at 2000 rpm.

Subsequently dimethylacetoacetamide (DMAA) was added and it was mixed for 1 minute at 2000 rpm. Afterwards the cobalt octoate was added and it was again mixed for 1 minute at 2000 rpm. After mixing, a lid was placed on the ½ pint can and the sample was placed in a 25° C. water bath for 24 hours. After 24 hours, the sample was removed from the water bath and Brookfield viscosity was measured at 1, 10, and 100 rpm.

Viscosity Measurements
The viscosities were measured in a Brookfield rheometer, spindle no. 3 at 1 rpm. As the viscosities of the compositions differ all values were normalized to make them easier comparable, e.g. for preparation 1 series in the unsaturated polyester formulation the acceptable target viscosity is 8,100 mPas and was set as 1 (normalized viscosity). For preparation 2 series in the unsaturated polyester formulation the acceptable target viscosity is 13,200 mPas and was set as 1 (normalized viscosity). All viscosities shown in the following Tables 1 and 2, respectively, are ratios towards this setting and are easier intercomparable at one glance.

Normalized viscosities below 1 are not considered to be acceptable in this comparison, while normalized viscosities of 1 and above are acceptable.

TABLE 1

| Preparation 1 Series Thickener made from hormite sample no. | Normalized Viscosity Formulation 1 | MBEC of the hormite clay used to produce the thickener |
|---|---|---|
| 1 | 1.38 | 12.5 |
| 2 | 1.48 | 10.0 |
| 3* | 0.96 | 21.3 |
| 4 | 1.39 | 16.3 |
| 5* | 0.99 | 21.3 |
| 6 | 1.23 | 16.3 |
| 7 | 1.90 | 13.8 |
| 8* | 0.98 | 21.3 |

*Comparative Examples

TABLE 2

| Preparation 2 Series Thickener made from hormite sample no. | Normalized Viscosity Formulation 2 | MBEC of the hormite clay used to produce the thickener |
|---|---|---|
| 1 | 1.21 | 12.5 |
| 2 | 1.60 | 10.0 |
| 3* | 0.78 | 21.3 |
| 4 | 1.04 | 16.3 |
| 5* | 0.80 | 21.3 |
| 6 | 1.32 | 16.3 |
| 7 | 1.60 | 13.8 |
| 8* | 0.87 | 21.3 |
| 9 | 1.42 | 10.8 |

*Comparative Examples

Figure 1:
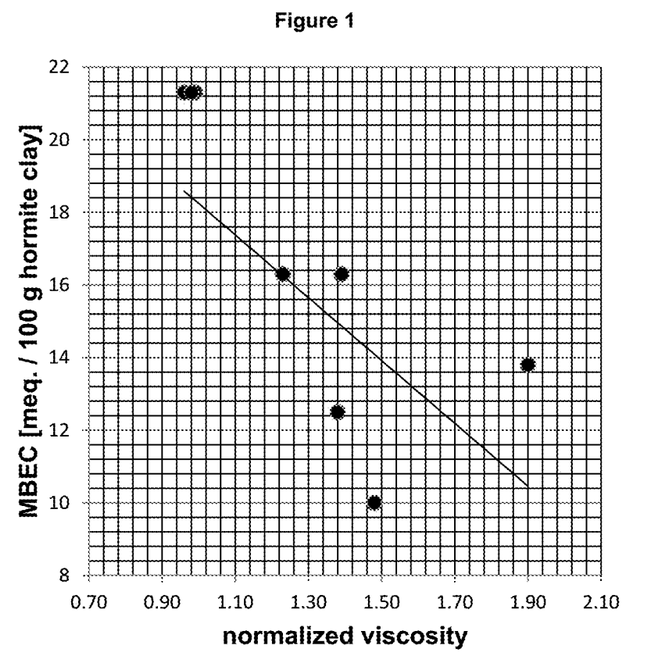
FIGS. 1 and 2, respectively, show the results from Tables 1 and 2 as xy-diagrams with the normalized viscosities as x-axis and MBEC values as y-axis.
Figure 2:
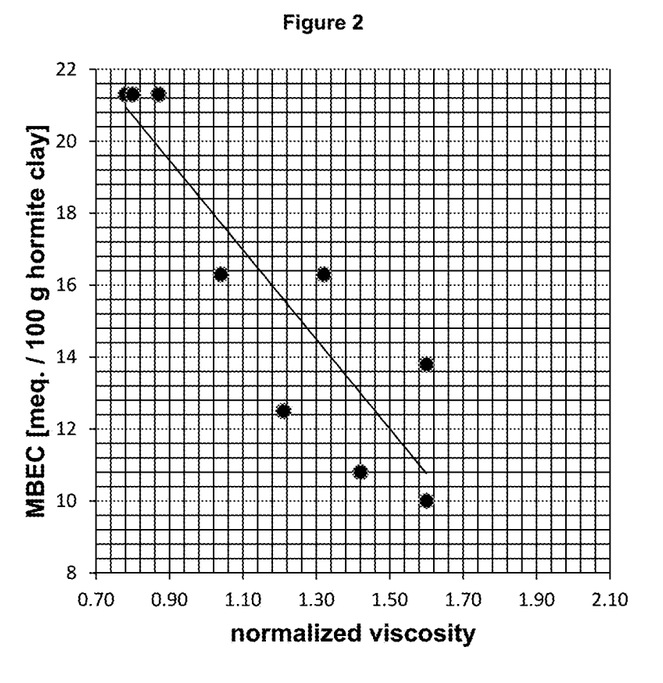

As can be learnt from FIGS. 1 and 2, there is a strong correlation of the effectiveness of the mineral organoclay rheology additives of the present invention in providing a thickening effect in the unsaturated polyester containing composition, dependent on the MBEC values of the hormite clay fraction being used to produce the additives of the present invention.

The invention claimed is:

1. A process comprising mixing
at least one mixed mineral organoclay rheology additive, which comprises a quaternary alkyl-ammonium salt treated mineral clay mixture prepared by
   i. forming an aqueous hormite clay slurry (a)
   ii. forming an aqueous smectite clay slurry (b)
   iii. combining the aqueous hormite clay slurry (a) with the aqueous smectite clay slurry (b) to form a combined clay slurry (c)
   iv. treating the combined clay slurry (c) with one or more quaternary alkyl-ammonium salts
   v. separating the thus produced quaternary alkyl-ammonium salt treated mineral clay mixture from the aqueous medium,
in which
the aqueous hormite clay slurry (a) being formed by
   (i.1) dispersing a fraction of one or more hormite clays selected from the group of sepiolites and palygorskites in an aqueous medium to form a dispersion,
and
the aqueous smectite clay slurry (b) being formed by
   (ii.1) dispersing a fraction of one or more smectite clays in an aqueous medium to form a dispersion,
and
in that the weight of the hormite clay content exceeds the weight of the smectite clay content in the combined clay slurry (c); and
subjecting the dispersions formed in (i.1) and (ii.1) to high speed fluid shear before carrying out step iii. and/or after having carried out step iii; and
wherein the one or more hormite clays employed in the formation of the aqueous hormite clay slurry (a) exhibit a methylene blue exchange capacity below 20 mmol methylene blue per 100 g of the one or more hormite clays in dry state, the methylene blue exchange capacity being determined on the part of an aqueous hormite clay slurry that passes a 100 mesh U.S. standard screen, and the hormite clay slurry before passing the 100 mesh U.S. standard screen having a particle size distribution such that at least 90% by weight of the hormite clay contained in the aqueous hormite clay slurry passes the 100 mesh U.S. standard screen,
in a liquid composition comprising at least one unsaturated polyester.

2. The process according to claim 1, the liquid composition further comprising at least one ethylenically unsaturated monomer.

3. The process according to claim 2, the at least one ethylenically unsaturated monomer being selected from the group of styrene, alpha-methylstyrene, methyl acrylate, methyl methacrylate, vinyl acetate, divinyl benzene, diallyl phthalate, triallylcyanurate, and triallyl phosphate and mixtures thereof.

4. A process for producing a mixed mineral organoclay rheology additive, which comprises a quaternary alkyl-ammonium salt treated mineral clay mixture, the process being characterized by:
   i. forming an aqueous hormite clay slurry (a)
   ii. forming an aqueous smectite clay slurry (b)
   iii. combining the aqueous hormite clay slurry (a) with the aqueous smectite clay slurry (b) to form a combined clay slurry (c)
   iv. treating the combined clay slurry (c) with one or more quaternary alkyl-ammonium salts, and
   v. optionally separating the thus produced quaternary alkyl-ammonium salt treated mineral clay mixture from the aqueous medium,
in which
the aqueous hormite clay slurry (a) being formed by
   (i.1) dispersing a fraction of one or more hormite clays selected from the group of sepiolites and palygorskites in an aqueous medium to form a dispersion,
and
the aqueous smectite clay slurry (b) being formed by
   (ii.1) dispersing a fraction of one or more smectite clays in an aqueous medium to form a dispersion,
and
in that the weight of the hormite clay content exceeds the weight of the smectite clay content in the combined clay slurry (c); and subjecting the dispersions formed in (i.1) and (ii.1) to highspeed fluid shear before carrying out step iii. and/or after having carried out step iii;

and wherein the one or more hormite clays employed in the formation of the aqueous hormite clay slurry (a) exhibit a methylene blue exchange capacity below 20 mmol methylene blue per 100 g of the one or more hormite clays in dry state, the methylene blue exchange capacity being determined on the part of an aqueous hormite clay slurry that passes a 100 mesh U.S. standard screen, and the hormite clay slurry before passing the 100 mesh U.S. standard screen having a particle size distribution such that at least 90% by weight of the hormite clay contained in the aqueous hormite clay slurry passes the 100 mesh U.S. standard screen.

5. The process according to claim 4, wherein the weight of the fraction of one or more hormite clays (i) based on the total weight of the clays in the combined clay slurry is from 60 to 95 wt. %.

6. The process according to claim 4 wherein the weight of the fraction of one or more smectite clays (ii) based on the total weight of the clays in the combined clay slurry is from 5 to 40 wt. %.

7. The process according to claim 4, wherein the one or more smectite clays are selected from the group consisting of hectorites, montmorillonites, bentonites, beidelites, saponites, stevensites and mixtures thereof.

8. The process according to claim 7, wherein the smectite clay is selected from the group consisting of hectorites, saponites and mixtures thereof.

9. The process according to claim 4, wherein the quaternary alkyl-ammonium salt contains the same or different straight-chain or branched, saturated or unsaturated alkyl groups having 1 to 22 carbon atoms and the counter-ion moiety is selected from the group consisting of chloride, bromide, methylsulfate, nitrate, hydroxide, acetate, phosphate and mixtures thereof.

10. The process according to claim 9, wherein the quaternary alkyl-ammonium salt is selected from the group consisting of dimethyl di($C_{14-18}$ alkyl) ammonium chloride, methyl benzyl di($C_{14-18}$ alkyl) ammonium chloride, dimethyl benzyl $C_{14-18}$-alkyl ammonium chloride, dimethyl $C_{14-18}$-alkyl 2-ethylhexyl ammonium methylsulfate and mixtures thereof.

11. The process according to claim 4, wherein the mineral clay mixture is treated with about 5 to 80 mmol of the quaternary alkyl-ammonium salt per 100 g of clay in the combined clay slurry.

12. The process according to claim 4, wherein subsequently to step (i.1) the aqueous slurry (a) and subsequently to step (ii.1) the aqueous slurry (b) are screened through an at least 100 mesh screen (U.S. standard mesh) to remove coarse particles.

13. The process according to claim 4, wherein the aqueous slurry (a) and the aqueous slurry (b) are subjected to high speed fluid shear by passing the respective slurry or a mixture of the slurries through a narrow gap, across which a pressure differential is maintained.

14. A process comprising mixing the mixed mineral organoclay rheology additives as obtained by the process according to claim 4 in a composition as thickening agent.

15. The process according to claim 14, wherein the mixed mineral organoclay rheology additives are used as thickening agents in a liquid composition.

16. The process according to claim 15, wherein the liquid composition is a liquid organic composition.

17. The process according to claim 16, wherein the liquid organic composition is selected from the group consisting of coating materials, sealants, adhesives, oil drilling fluids, gas drilling fluids, composite materials, moulding compounds and liquid organic compositions which contain besides the mixed mineral organoclay rheology additive only one or more organic solvents.

18. The process according to claim 15, wherein the mixed mineral organoclay rheology additive is contained in an amount from 0.1 to 10 wt.-% based on the total weight of the liquid composition.

19. The process according to claim 1, comprising mixing at least one mixed mineral organoclay rheology additive, which consists of a quaternary alkyl-ammonium salt treated mineral clay mixture prepared by i. forming an aqueous hormite clay slurry (a)
ii. forming an aqueous smectite clay slurry (b)
iii. combining the aqueous hormite clay slurry (a) with the aqueous smectite clay slurry (b) to form a combined clay slurry (c)
iv. treating the combined clay slurry (c) with one or more quaternary alkyl-ammonium salts
v. separating the thus produced quaternary alkyl-ammonium salt treated mineral clay mixture from the aqueous medium, in which the aqueous hormite clay slurry (a) being formed by
(i.1) dispersing a fraction of one or more hormite clays selected from the group of sepiolites and palygorskites in an aqueous medium to form a dispersion, and the aqueous smectite clay slurry (b) being formed by
(ii.1) dispersing a fraction of one or more smectite clays in an aqueous medium to form a dispersion, and in that the weight of the hormite clay content exceeds the weight of the smectite clay content in the combined clay slurry (c); and subjecting the dispersions formed in (i.1) and (ii.1) to high speed fluid shear before carrying out step iii. and/or after having carried out step iii; and wherein the one or more hormite clays employed in the formation of the aqueous hormite clay slurry (a) exhibit a methylene blue exchange capacity below 20 mmol methylene blue per 100 g of the one or more hormite clays in dry state, the methylene blue exchange capacity being determined on the part of an aqueous hormite clay slurry that passes a 100 mesh U.S. standard screen, and the hormite clay slurry before passing the 100 mesh U.S. standard screen having a particle size distribution such that at least 90% by weight of the hormite clay contained in the aqueous hormite clay slurry passes the 100 mesh U.S. standard screen, in a liquid composition comprising at least one unsaturated polyester.

20. The process according to claim 4, comprising producing a mixed mineral organoclay rheology additive, which consists of a quaternary alkyl-ammonium salt treated mineral clay mixture, the process being characterized by:

i. forming an aqueous hormite clay slurry (a)
ii. forming an aqueous smectite clay slurry (b)
iii. combining the aqueous hormite clay slurry (a) with the aqueous smectite clay slurry (b) to form a combined clay slurry (c)
iv. treating the combined clay slurry (c) with one or more quaternary alkyl-ammonium salts, and v. optionally separating the thus produced quaternary alkyl-ammonium salt treated mineral clay mixture from the aqueous medium, in which the aqueous hormite clay slurry (a) being formed by
(i.1) dispersing a fraction of one or more hormite clays selected from the group of sepiolites and palygorskites in an aqueous medium to form a dispersion, and the aqueous smectite clay slurry (b) being formed by
(ii.1) dispersing a fraction of one or more smectite clays in an aqueous medium to form a dispersion, and in that the weight of the hormite clay content exceeds the weight of the smectite clay content in the combined clay slurry (c); and subjecting the dispersions formed in (i.1) and (ii.1) to highspeed fluid shear before carrying out step iii. and/or after having carried out step iii;

and wherein the one or more hormite clays employed in the formation of the aqueous hormite clay slurry (a) exhibit a methylene blue exchange capacity below 20 mmol methylene blue per 100 g of the one or more hormite clays in dry state, the methylene blue exchange capacity being determined on the part of an aqueous hormite clay slurry that passes a 100 mesh U.S. standard screen, and the hormite clay slurry before passing the 100 mesh U.S. standard screen having a particle size distribution such that at least 90% by weight of the hormite clay contained in the aqueous hormite clay slurry passes the 100 mesh U.S. standard screen.

* * * * *